June 23, 1959 G. DUCOMMUN 2,891,378

TIMEPIECE

Filed June 29, 1954

INVENTOR
GEORGES DUCOMMUN
BY Edward F. Connors
ATTORNEY

United States Patent Office 2,891,378

Patented June 23, 1959

2,891,378

TIMEPIECE

Georges Ducommun, Grenchen, Switzerland, assignor to Baumgartner Freres S.A., Grenchen, Switzerland Application June 29, 1954, Serial No. 440,182

Claims priority, application Switzerland July 10, 1953

2 Claims. (Cl. 58—127)

There are already known in the art timepieces comprising a disc carrying pictures and rotated by the gear-work of the movement, a window being provided in the dial and permitting to perceive successively the different pictures appearing on the disc.

The effect produced by the constructions of this type is rather monotonous, as the pictures represent subjects which are motionless and lifeless; on the other hand, the number of the pictures carried by a disc is necessarily limited.

The invention aims at overcoming these drawbacks. To this end, the timepiece according to the invention comprises two discs tangent to each other, which are driven by the gear-work of the movement and on which figure pictures, a portion of these pictures appearing through a window provided in the dial, the whole being arranged in such a way that when the timepiece is running, a picture of one of the discs comes temporarily opposite a picture of the other disc, and then gives place to other pairs of pictures.

An embodiment of the invention will now be further described by way of example with reference to the accompanying drawing, in which.

Figure 3:
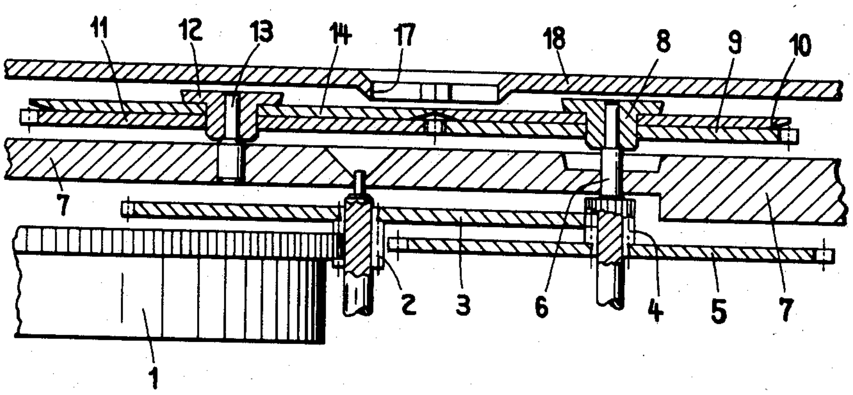
Figure 3 is a cross-sectional view, on the same scale as Figure 2, of a portion of the watch movement, showing the driving means for the picture-holder discs.

The watch shown in the drawing comprises a standard movement of the Roskopf type, having a barrel 1 which drives the escape pinion, not shown, through the gears 2, 3 and 4, 5. The spindle 6 of the seconds gear on wheel 5 has an extension beyond the pillar plate 7 and carries at its upper end (Figure 3), through the intermediary of a hub 8, a toothed wheel 9. On the upper face of the wheel 9 there is secured a disc 10. The wheel 9 is permanently in mesh with a toothed wheel 11 rigidly secured to a hub 12 rotatably mounted on a pin 13 fixed to the pillar plate 7. The wheel 11 carries on its upper face a disc 14. The two discs 10 and 14 are tangent to each other.

On each of the discs 10 and 14 are figure pictures 15 and 16, respectively. In the case shown in the drawing, the disc 10 has seven pictures 15, whereas the disc 14 has eight pictures 16. The pictures of each disc are incomplete; for instance, the pictures 16 of the disc 14 represent the upper portion, from the head to the waist, of personages, whereas the pictures 15 of the disc 10 show the lower portion, from the waist to the feet, of these personages.

A window 17 is provided in the dial 18 within reach of the point of contact of the discs 10 and 14, and enables one to perceive a portion of the pictures 15 and 16.

Figures 1, 2:
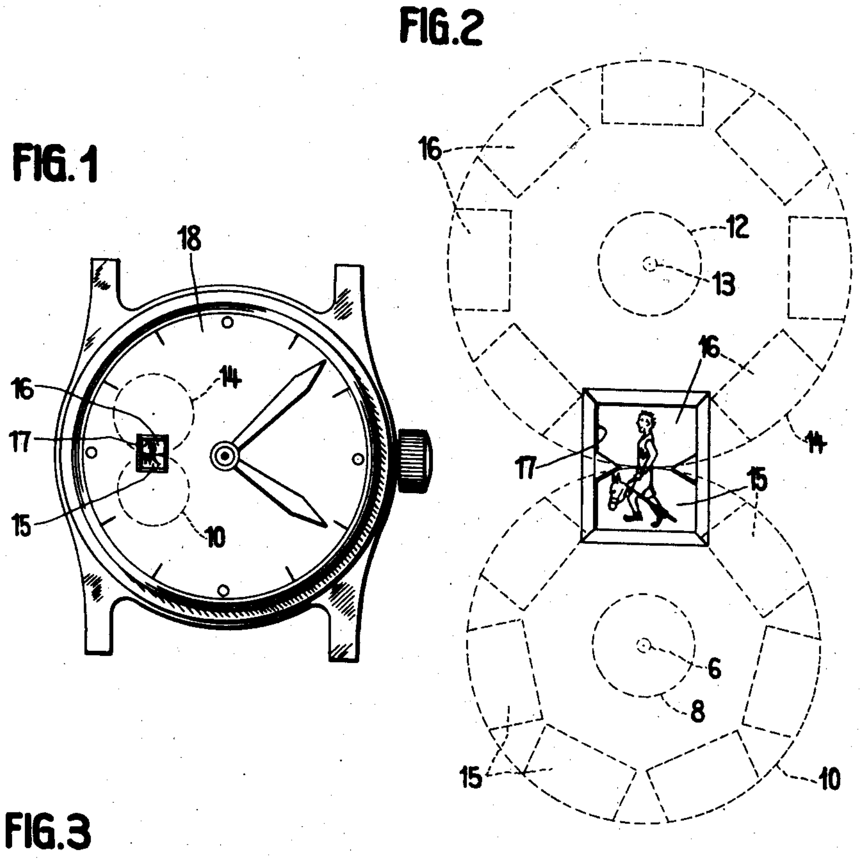
Figure 1 is a plan view of a watch according to the invention.
Figure 2 illustrates, on an enlarged scale, the two discs carrying the pictures.

When the watch is running, its gear-work drives the disc 10 which in turn rotates the disc 14. Owing to the existence of the escapement, the discs 10 and 14 are moved by jerks. Upon the rotation of the discs 10 and 14, a picture 15 of the disc 10 comes temporarily opposite a picture 16 of the disc 14, as shown in Figure 2, and then this pair of pictures gives place to other pairs of pictures. When two pictures 15 and 16 come near and arrive opposite each other and then diverge, there is produced so to speak an illusion of motion somewhat resembling the effect of animated cartoons.

As the number of the pictures is different on each disc, a picture 15 of the disc 10, which lies opposite a certain picture 16 of the disc 14, will arrive, after a complete revolution of the disc 10, opposite another picture 16 of the disc 14. In the case of the example illustrated, the shifting will be of one picture for each revolution, and the total number of the combination will be $7 \times 8 = 56$.

The number of the pictures might also be the same on each disc. In this case, at each revolution of one of the discs, the pairs of pictures will be identical and the number of the combinations will be equal to the number of the pictures carried by each disc.

In a modified embodiment, the pictures of each disc might also be complete and then, on rotation of the discs, animated pictures comprising two subjects are perceived through the window 17.

Instead of being driven by the seconds wheel 5, the toothed wheel 9 carrying the disc 10 might also be rotated by another runner of the movement, for instance by the wheel 3 or the escape wheel.

While a representative embodiment and details have been shown for the purpose of illustrating the invention, it will be apparent to those skilled in the art that various changes and modifications may be made therein without departing from the spirit or scope of the invention.

What I claim is:

1. A timepiece including a powered movement producing at least intermittent motion, a train of gears terminating in a seconds gear, a pair of tangent discs, the two discs each secured to a gear driven by the train of gears to rotate one revolution per minute, the discs gears being in mesh thereby providing opposite directions of rotation of the discs, and a windowed dial having a single viewing opening and positioned at the point of tangency of the discs, each of the discs having a plurality of portions of pictures of at least one normally moving animated object, the portions of the pictures of the objects on either of the discs complementary with any of the portions of the pictures on the other disc to present a composite picture, the rotation of the discs thereby creating an illusion of animated motion somewhat resembling the effect of animated cinematographic cartoons.

2. A timepiece according to claim 1 in which the number of pictures on one disc is different from the number of pictures on the other disc.

References Cited in the file of this patent

UNITED STATES PATENTS

| | | |
|---|---|---|
| 822,776 | Schweizer-Schatzmann | June 5, 1906 |
| 1,878,683 | Drake | Sept. 20, 1932 |
| 2,264,087 | Lorimer | Nov. 25, 1941 |
| 2,641,856 | Gabrielsen | June 16, 1953 |

FOREIGN PATENTS

| | | |
|---|---|---|
| 460,931 | France | Dec. 15, 1913 |